United States Patent
Maes et al.

(10) Patent No.: US 9,882,829 B2
(45) Date of Patent: Jan. 30, 2018

(54) ORCHESTRATING HYBRID CLOUD SERVICES

(75) Inventors: Stephane Herman Maes, Sunnyvale, CA (US); Mark Perreira, Fremont, CA (US); Bryan P. Murray, Duvall, WA (US); Rajeev Bharadhwaj, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 264 days.

(21) Appl. No.: 14/394,656

(22) PCT Filed: Jul. 31, 2012

(86) PCT No.: PCT/US2012/048991
§ 371 (c)(1),
(2), (4) Date: Oct. 15, 2014

(87) PCT Pub. No.: WO2014/021849
PCT Pub. Date: Feb. 6, 2014

(65) Prior Publication Data
US 2015/0074279 A1    Mar. 12, 2015

(51) Int. Cl.
*G06F 15/173* (2006.01)
*H04L 12/911* (2013.01)
(Continued)

(52) U.S. Cl.
CPC .......... *H04L 47/781* (2013.01); *G06F 9/5072* (2013.01); *H04L 67/16* (2013.01)

(58) Field of Classification Search
CPC ........ H04L 63/20; H04L 67/10; H04W 12/06; H04W 12/08; G06F 21/6218
See application file for complete search history.

(56) References Cited

U.S. PATENT DOCUMENTS

| | | |
|---|---|---|
| 2011/0231899 A1 | 9/2011 | Pulier et al. |
| 2012/0011077 A1 | 1/2012 | Bhagat |

(Continued)

FOREIGN PATENT DOCUMENTS

| | | |
|---|---|---|
| CN | 102255933 A | 11/2011 |
| EP | 2439637 A1 | 4/2012 |

(Continued)

OTHER PUBLICATIONS

B. Adler, Designing Private and Hybrid Clouds, Whitepaper, Apr. 17, 2012, 18 pages, http://www.rightscale.com/info_center/white-papers/rightscale-white-paper-designing-private-hybrid-cloud.

(Continued)

*Primary Examiner* — Peling Shaw
(74) *Attorney, Agent, or Firm* — Hewlett Packard Enterprise Patent Department

(57) ABSTRACT

A technique includes providing a first interface to manage a plurality of cloud services that are provided by a plurality of cloud resources that form a hybrid cloud. Each of the cloud resources is associated with an application programming interface. The technique includes using the first interface to orchestrate the cloud services, where the orchestration includes using the first interface to orchestrate the application programming interfaces to allow at least one cloud resource management function provided by the first interface to be performed across at least two of the cloud resources.

20 Claims, 6 Drawing Sheets

(51) Int. Cl.
  *G06F 9/50* (2006.01)
  *H04L 29/08* (2006.01)

(56) References Cited

U.S. PATENT DOCUMENTS

| | | | |
|---|---|---|---|
| 2012/0054626 A1 | 3/2012 | Odenheimer | |
| 2012/0096149 A1 | 4/2012 | Sunkara et al. | |
| 2012/0124211 A1 | 5/2012 | Kampas et al. | |
| 2012/0204169 A1* | 8/2012 | Breiter | G06F 9/44526 717/171 |
| 2013/0067090 A1* | 3/2013 | Batrouni | H04L 67/1097 709/226 |
| 2013/0191539 A1* | 7/2013 | Sailer | H04L 67/34 709/225 |
| 2013/0232498 A1* | 9/2013 | Mangtani | G06F 9/5072 718/104 |
| 2013/0281192 A1* | 10/2013 | Arnone | G07F 17/3288 463/25 |
| 2014/0007079 A1* | 1/2014 | Whitney | H04L 67/10 717/176 |
| 2015/0295731 A1* | 10/2015 | Bagepalli | H04L 12/6418 370/401 |

FOREIGN PATENT DOCUMENTS

| | | |
|---|---|---|
| WO | WO-2010151273 A1 | 12/2010 |
| WO | WO-2011067062 A2 | 6/2011 |

OTHER PUBLICATIONS

I. Hardenburgh, Eucalyptus Provides Adaptable and Cost-effective Hybrid Cloud Option, Blog, Apr. 4, 2012.

J. Judkowitz, Hybrid Cloud with Nimbula and Amazon Web Services Executive Summary, Blog, Apr. 12, 2012, 2 pages, http://blog.nimbula.com/corporate/2012/04/hybrid-cloud-with-nimbula-and-arnazon-web-services/.

J. Whitehurst, Red Hat CloudForrns is an Open Hybrid Cloud Management Product, Jun. 11, 2012, http://www.hostingtecnews.com/red-hat-cloudforms-open-clouds-under-your-control.

International Searching Authority, "Notification of Transmittal Od The International Search Report and the Written Opinion", PCT/US2012/048991, dated Feb. 7, 2013.

* cited by examiner

ORCHESTRATING HYBRID CLOUD SERVICES

BACKGROUND

A cloud service generally refers to a service that allows end recipient computer systems (thin clients, portable computers, smartphones, desktop computers and so forth) to access a pool of hosted computing and/or storage resources (i.e., the cloud resources) and networks over a network (the Internet, for example). In this manner, the host, a cloud service provider, may, as examples, provide Software as a Service (SaaS) by hosting applications; Infrastructure as a Service (IaaS) by hosting equipment (servers, storage components, network components, etc.); or Platform as a Service (PaaS) by hosting a computing platform (operating system, hardware, storage, etc.).

A typical cloud service incurs charges on a demand basis, is managed by the cloud service provider and may be scaled (scaled according to desired storage capacity, processing power, network bandwidth and so forth) by the end user. The cloud service may be a public service (an Internet-based service, for example) that is generally available to all potential users or a limited access private service that is provided over a private network (a business enterprise network, for example) as well as a managed cloud service (e.g., a virtual private cloud service) or a hybrid cloud service (a cloud service that is a combination of the above).

DETAILED DESCRIPTION

Cloud service providers typically offer cloud services in many different forms. For example, although different cloud service providers may provide Information as a Service (Iaas)-based cloud services, the manner in which these services are delivered differ in such ways as the application programming interfaces (APIs) that are offered; the services that are provided through these APIs in terms of capabilities and the properties/characteristics of these capabilities (the locations, the capacities, and so forth); and the technologies used to deliver these capabilities. In accordance with example implementations, which are disclosed herein, cloud services, such as IaaS services, may be provided by to a given end user system in the form of a hybrid cloud that is formed from a multitude of clouds, which, in turn, may be associated with multiple cloud service providers and technologies.

In this regard, in example implementations that are disclosed herein, the services are provided to an end user system by a hybrid cloud may be formed from a combination of multiple clouds having two or more cloud types. The different cloud types refers to clouds formed from traditional networks; public clouds (and possibly multiple service providers); private clouds (business enterprise-based clouds, for example); next generation data centers (data centers that provide cloud services such as IaaS and other cloud services); managed clouds (on the premise for virtual clouds); virtual private clouds (limited access clouds formed from public clouds, for example); and so forth.

Figure 1:
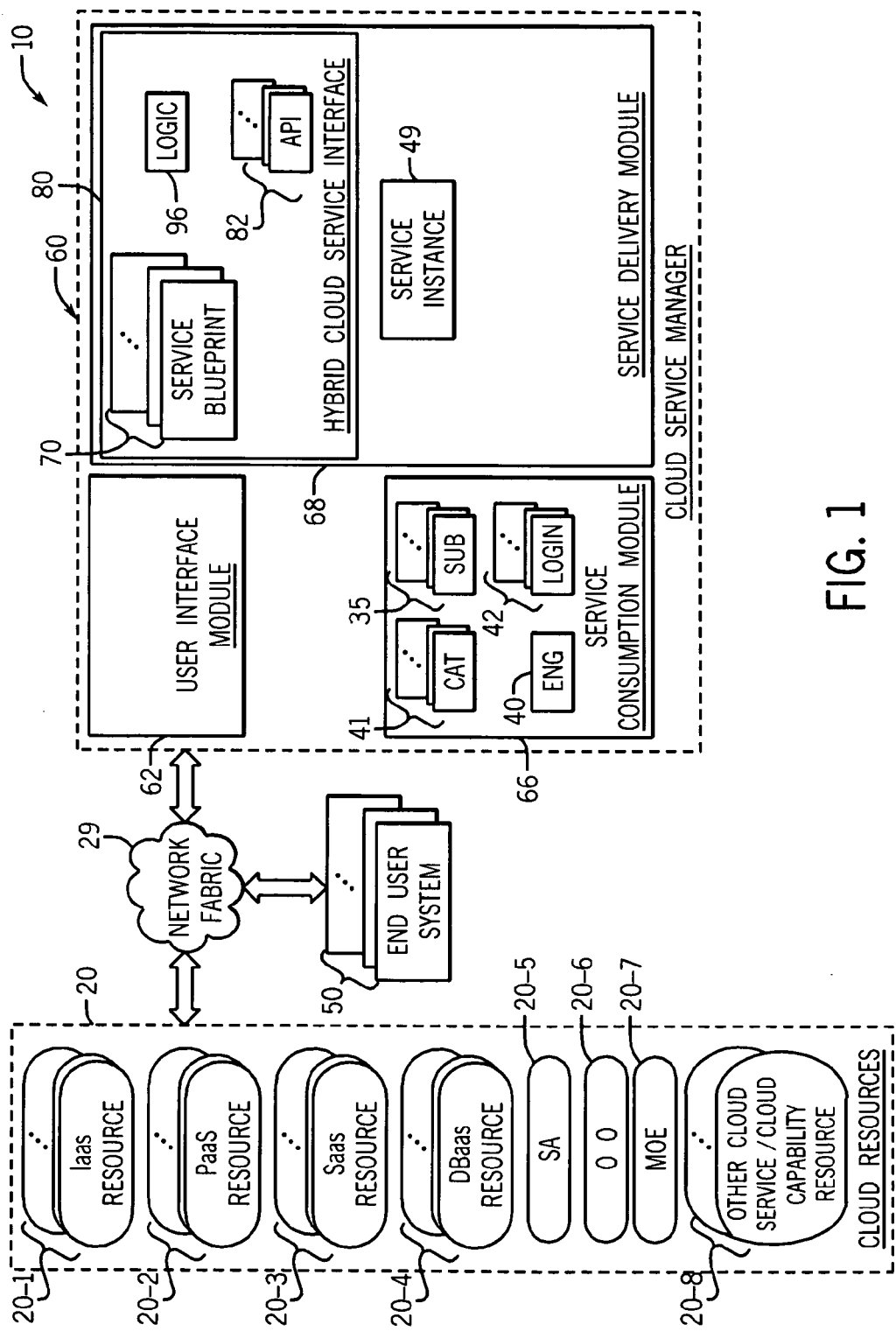
FIG. 1 is a schematic diagram of a hybrid cloud system according to an example implementation.
Figure 2:
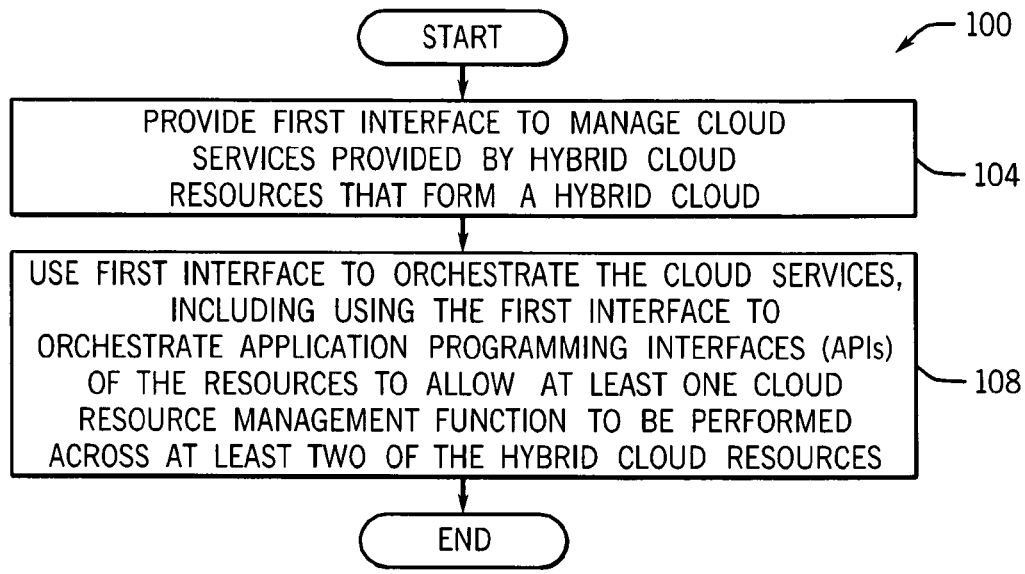
FIG. 2 is a flow diagram depicting a technique to orchestrate hybrid cloud services according to an example implementation.

Referring to FIG. 1, systems and techniques that are disclosed herein for purposes of orchestrating APIs 82 associated with constituent clouds of a hybrid cloud for purposes of allowing at least one cloud resource management function to be performed across two or more of the constituent clouds. More specifically, referring to FIG. 2 in conjunction with FIG. 1, in accordance with example implementations that are disclosed herein, a technique 100 includes providing (block 104) a first interface to manage cloud services provided by hybrid cloud resources that form a hybrid cloud. In this manner, the first interface is used (block 108) to orchestrate the cloud services, including using the first interface to orchestrate APIs to allow at least one cloud resource management function to be performed across at least two of the cloud resources. The orchestration of the APIs 82 manages functions across the cloud services for users of user end systems 50 (desktops, portable computers, smartphones, clients, thin clients, servers, and so forth).

FIG. 1 depicts an example implementation of system 10 in a service blueprint-based architecture that is used to orchestrate the APIs 82. More particularly, as disclosed herein, a cloud service manager 60 of the system 10 orchestrates the APIs 82 of existing cloud hybrid services.

As depicted in FIG. 1, the cloud service manager 60 may be accessed by a given end user system 50 via network fabric 29 (network fabric formed from one or more of local area network (LAN) fabric, wide area network (WAN) fabric, Internet fabric, and so forth). As such, depending on the particular implementation, the cloud service manager 60 may reside on an Internet server, reside on a server within a private LAN, reside on a server within a WAN, reside on a desktop computer, or may be a web or SaaS (Software as a service), as just a few examples.

In general, the users of the cloud service manager 60 may select and order, manage and monitor "cloud capabilities" through the cloud service manager 60, where the "cloud capabilities" refer to user-selected combinations of existing cloud services that are provided by existing cloud resources 20, as well as lifecycle management services that are offered and delivered by the cloud service manager 60. All of these cloud capabilities (the existing cloud services, the combinations of the existing cloud services and the lifecycle management services) are generally referred to herein as "cloud capabilities" herein.

In general, the cloud service manager 60 contains a user interface module 62 that contains one or more graphical user interfaces (GUIs) and/or APIs, that allow a user to access a service consumption module 66 (of the cloud service manager 60) for purposes of browsing, selecting, ordering, managing and/or monitoring cloud capabilities that are offered by the cloud service manager 60. Moreover, the user interface module 62 permits the end user system 50, via a hybrid cloud service interface 80, to perform one or more functions across multiple clouds of the hybrid cloud. In this regard, via the hybrid cloud service interface 80, the end user system 50 may access one or more cloud resources 20 of the hybrid cloud, such as an IaaS resource 20-1 (a resource that provides hosted equipment, such as servers, storage components and network components as a service); a Platform as a Service (PaaS) resource 20-2 (a resource that provides a hosted computing platform such as an operating system, hardware, storage, and so forth); a Software as a Service (SaaS) resource 20-3 (a resource that provides hosted applications as a service); a DataBase as a Service (DBaaS) resource 20-4 (a resource that provides a hosted database as a service); and so forth.

The available existing cloud resources 20 further include, in accordance with example implementations, resources 20 that provide other services for the hybrid cloud, such as (as examples), resources 20-5, 20-6 and 20-7 that provide services derived from their provisioning using the Server Automation (SA), Database Middleware Automation (DMA), Matrix Operating Environment (MOE), or Operations Orchestration (OO) software available from Hewlett Packard® and other any other infrastructure provisioning or IaaS provisioning system. Thus, in general, the cloud resources may include these as well as other cloud services/capabilities 20-8, in accordance with further implementations.

It is noted that one or multiple of the existing cloud resources 20 may be provided by the cloud service manager 60, in accordance with example implementations.

In accordance with example implementations, the hybrid cloud service interface 80 orchestrates a set of cloud service APIs 82 for purposes of allowing the APIs 82 to be subscribed to and managed. In accordance with some implementations, the APIs 82 may include, as examples, a set of IaaS APIs to perform "basic" IaaS life cycle management functions, such as APIs to launch a specified number of cloud service instances, terminate cloud service instances, reboot one or more cloud service instances, cluster virtual machines (VMs), acquire information about specific VM clusters, update information about VM clusters, delete VM clusters, migrate VMs, list servers, start selected servers, stop selected servers, configure selected servers, delete selected servers, reboot selected servers, configure networks, configure storage volumes, configure object stores, list object stores, and so forth.

In accordance with some implementations, the APIs 82 are coarse grain APIs that are associated with coarse grain services shared in common among the clouds of the hybrid cloud. However, as further described herein, in accordance with further example implementations, the hybrid cloud service interface 80 allows supplementation to the basic APIs with additional APIs that may be later defined/added or discovered for purposes of providing additional cloud service management functions (e.g., specifying exactly which resource pool to use or discovering resource pool capabilities, as discussed hereafter).

Figure 3:
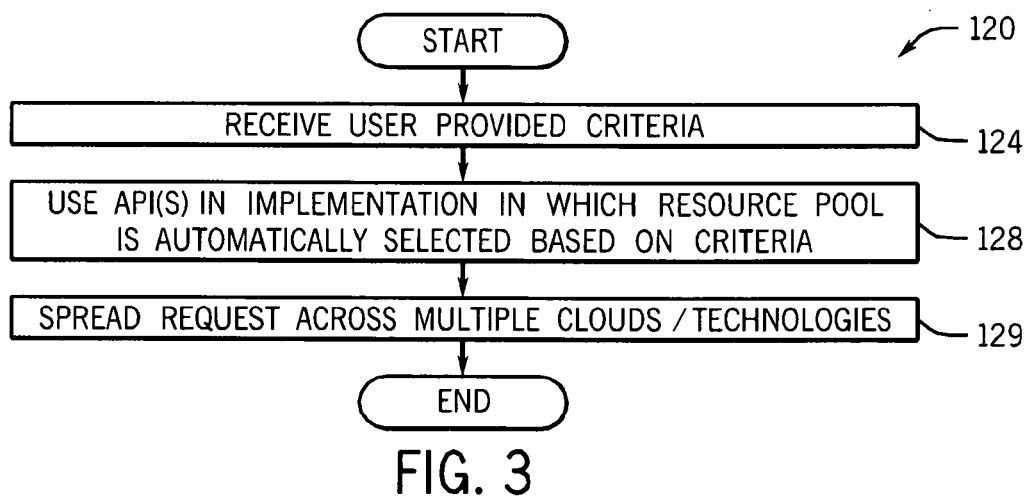
FIG. 3 is a flow diagram depicting a technique to search hybrid cloud resources according to an example implementation.

In accordance with some implementations, some of the APIs 82 may target a specific cloud or pool of resources; and other APIs 82 may be in respective forms that do not specify a certain cloud or pool. In some implementations, the APIs 82 may be used in an implementation to query or discover an available pool of resources. In this regard, the query may be used for purposes of identifying a specific cloud or pool of cloud resources so that a proper identifier or identifiers may be acquired for subsequently accessing this pool. In this regard, referring to FIG. 3, in accordance with some implementations, such an API implementation may perform a technique 130 that includes receiving (block 124) user provided search criteria and allowing the hybrid cloud service interface 80 to be used (via the APIs 82), pursuant to block 128, to automatically select a resource pool based on the search criteria. The technique 130 includes spreading (block 129) the request across multiple clouds (for the case of a hybrid cloud) or across multiple network technologies (such as the case of a heterogeneous cloud that is implemented by different resource resource technologies, for example).

As further examples, the APIs 82 may be used in an exemplary implementation in which a particular API of a target pool or resource (an IaaS or management system, for example) may be called for purposes of allowing the API to provision the resource and possibly subsequently manage the resource when the target pool/cloud is specified. As another example, an exemplary implementation may use the APIs 82 to determine the best pool/cloud or pools/clouds (according to a selection criteria) to provision and then manage them otherwise. In this regard, in accordance with some implementations, an exemplary implementation may use the API 82 to determine the best pool based on a capacity consideration; a latency or delay consideration; an availability consideration (scheduled maintenance, etc.); a service level agreement (SLA) consideration; a quality of service (QoS) consideration; a load consideration; and/or some other decision strategy or criteria, depending on the particular implementation.

As another example, the APIs 82 may be used, in an exemplary implementation, to provide metadata as a result of a search to allow the requester to determine the best target pool of resources or cloud(s) of the hybrid could.

As another example, one or multiple APIs 82 may be used in an exemplary implementation in which user requests are checked against certain policy requirements. In this regard, referring to FIG. 4, in accordance with some implementations, a technique 130 includes receiving (block 134) a user request for a cloud service action and checking (block 138) the cloud service action against the policy. Correction may then be selectively taken by the implementation that uses the API(s) 82, pursuant to block 142. For example, if the policy prohibits the action due to, for example, location or a cost restriction, a given API 82 may recommend an alternative resource/service type. Other variations are contemplated, and are within the scope of the appended claims. For example, in further implementations, in accordance with some implementations, the hybrid cloud service interface 80 may create a service instance 49 (see FIG. 1) for the purpose of tracking a particular service across the cloud, including managing and monitoring the service. As another variation, one or more issues identified as a result of the check may be communicated back to the requester, who, in turn, may correct the request.

In accordance with some implementations, the addition of a new pool of resources or cloud is accomplished by providing a corresponding identification (ID) and an API 82 for the new resource/cloud, cataloging the corresponding capabilities, creating instances, and so forth. In other implementations an ID may not be passed. Moreover, as further disclosed herein, in some implementations, adding a new pool or resources or cloud adds a new capability (adds storage capability that was previously not offered, for example), and the hybrid cloud service interface 80 orchestrates the one or multiple APIs of the new services.

In accordance with example implementations, the cloud service manager 60 uses service blueprints 70 to orchestrate the APIs 82. Each service blueprint 70 has an associated collection of functions, or "recipes," which may be executed (by logic 96, for example) for purposes of orchestrating the APIs 82. The APIs 82 are objects of the service blueprints 70 and are executed for purposes of performing the above-described cloud management functions that may occur across the hybrid cloud. In this regard, execution of a particular set of recipes may cause the orchestration of the appropriate API 82 to provision, instantiate and build a cloud services; monitor a cloud service, meter a cloud service; perform searches across the hybrid cloud; locate a particular pool of resources; recommend a pool of resources; check requested functions against certain policies; and so forth. A recipe may be a script or workflow or any other executable, in accordance with example implementations, which may be executed by the logic 96 for purposes of performing the actions specified by the service blueprint 70.

A given service blueprint 70 may be instantiated/deployed by executing its associated recipe(s), which results in a service instance, such as exemplary service instance 49 of FIG. 1, that may be tracked, for example, information technology (IT) management systems by feeding the service instance into an IT service management (ITSM) service, a real time service management (RTSM) service, or a configuration management database (CMDB) with a full topology of how a service instance is supported/implemented. In this manner, in accordance with example implementations, the service delivery module 68 may contain a service instance service management component 49 (e.g., an RTSM, CMDB or ITSM) for this purpose. If shared across an ITSM system, the component 49 may be available for other management systems to monitor and manage separately the instantiated instances (identified and tracked based on topology information stored in the database). In accordance with some implementations, the actions to set up the monitoring and management are achieved through the use of the service blueprints 70.

In accordance with some implementations, additional APIs may also be implemented as recipes calling the different pools. New services may be built with traditional service blueprint designer and discovery may be based on querying the repository of service compositions/service blueprints.

Figure 4:
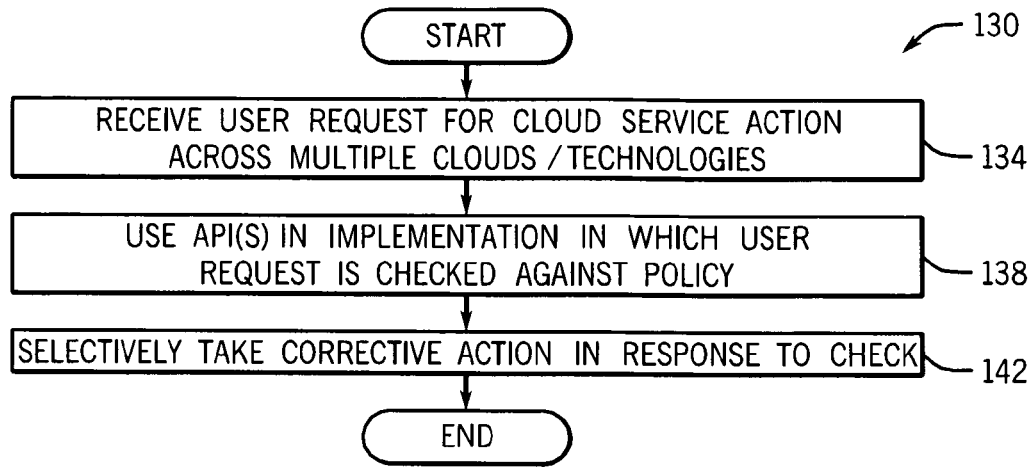
FIG. 4 is a flow diagram depicting a technique to check a requested action against predetermined policies according to an example implementation.
Figure 5:
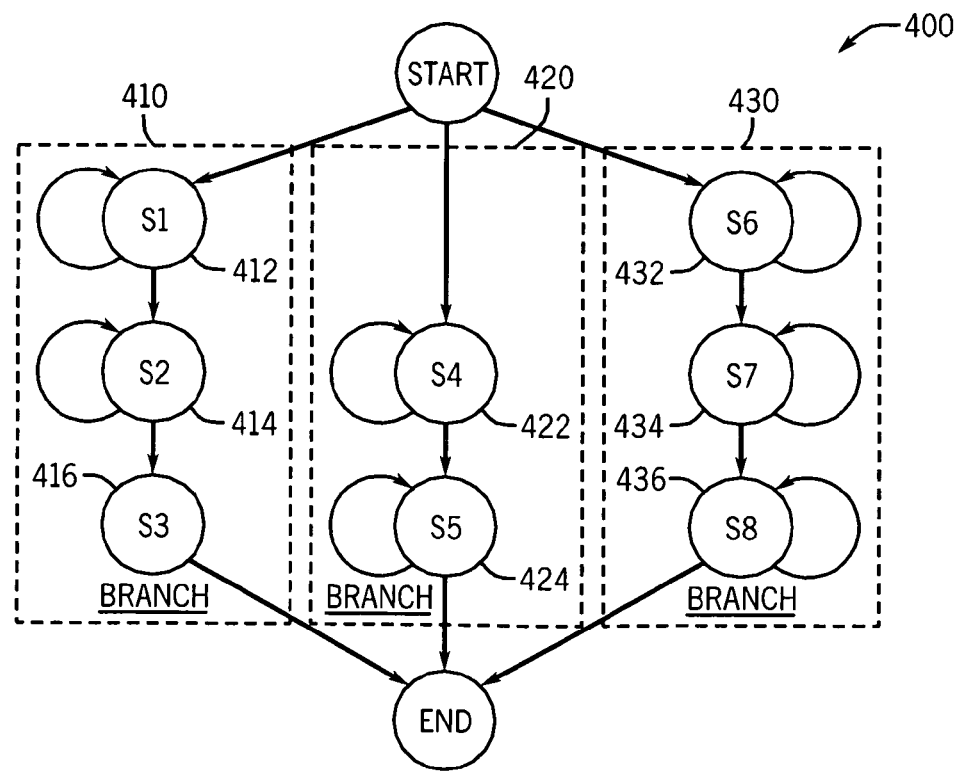
FIG. 5 is an illustration of a recipe according to an example implementation.
Figure 6:
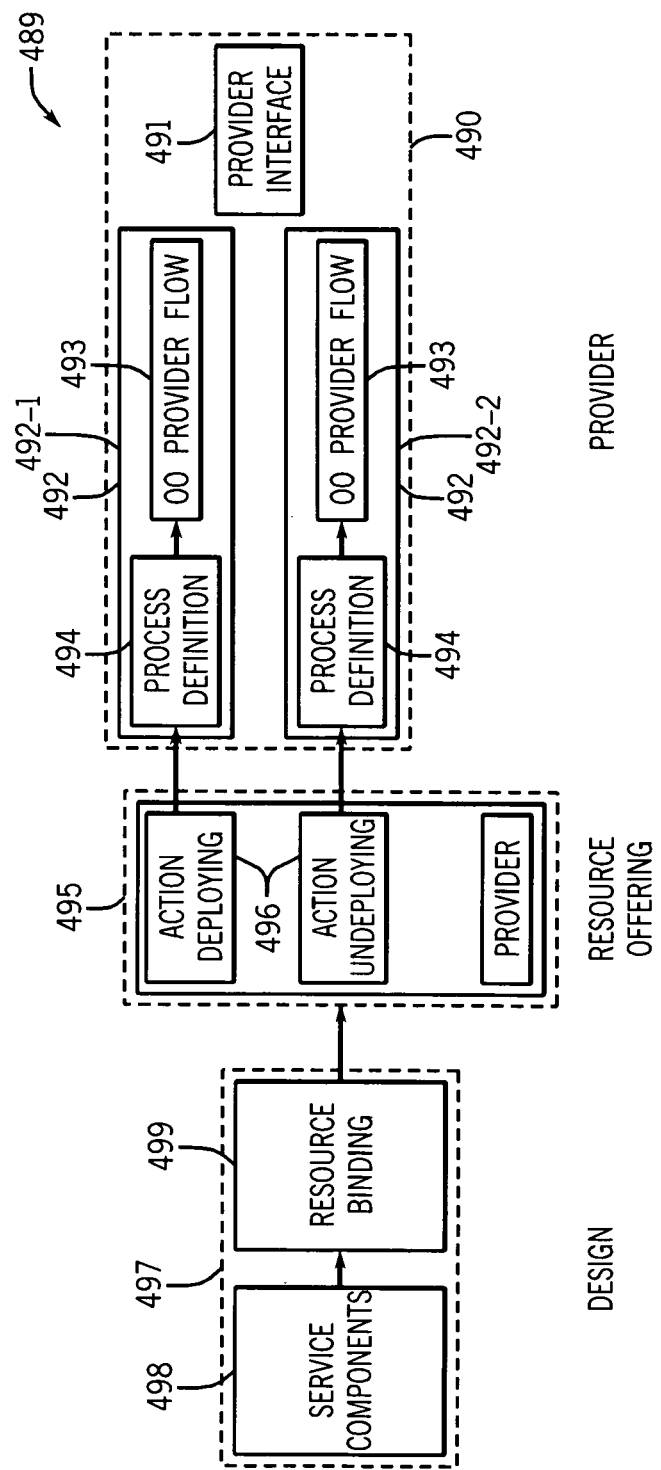
FIG. 6 is a flow diagram depicting a technique to design a service using a service blueprint according to an example implementation.

Referring to FIG. 6, in accordance with some implementations, a service blueprint 70 may be constructed using a workflow 489 that is illustrated in FIG. 4. Pursuant to the workflow 489, a cloud service provider 490 may include a provider interface 491 that has GUIs and tools that allow a designer/administrator to construct orchestrated flows 492-1 and 492-2, which are defined by associated process definitions 494. These orchestrated flows, in turn, create actions 496 for resource offerings 495. Thus, for example, the workflow 489 of FIG. 4 produces may produce one or more service blueprints 70 that have a design 497 constructed of service components 498 and resource bindings 499.

Referring back to FIG. 1, in addition to presenting the service offerings, the cloud service manager 60 includes a service consumption module 66, which regulates user subscriptions to these services, in accordance with example implementations. In this manner, as depicted in FIG. 1, in accordance with some implementations, the service consumption module 66 includes catalogs 41, which users may browse to review and select offered cloud capabilities. The service consumption module 66 may contain such other components, such as user login components 42 (components managing passwords/login identifications and so forth); user and tenant information; user subscription components 35 (components describing subscription contract terms, subscription rates, and so forth); and an engine 40 that contains logic that allows access and modification to the offered services, updating of subscription data, updating of login information and so forth.

The designers/administrators may also use GUI-based tools of the service delivery module 68 to modify existing service blueprints 70 and form new service blueprints 70 based on combinations of existing service blueprints 70.

In accordance with exemplary implementations, a given recipe may automate the actions that a given user may otherwise undertake for purposes of performing a cloud service across one or more clouds and/or technologies. For example, referring to FIG. 6 in conjunction with FIG. 1, an exemplary recipe 400 may use exemplary branches 410, 420 and 430 for purposes of abstracting different IaaS technologies and clouds. In this manner, the branches 410, 420 and 430 may be, for example, associated with multiple clouds and/or resource pools that are used to perform a given cloud service action. Each branch 410, 420 and 430 uses the appropriate APIs 82 to make calls (illustrated by states 412, 414 and 416 of the branch 410; states 422 and 424 of the branch 420; and states 432, 434 and 436 of the branch 430) to perform the action for these cloud(s)/resource pool(s).

In accordance with some implementations, cloud service designers may design new recipes to build higher level services as executable or work flow/composition/business process/scripts (i.e., flows of conditions and actions) of API calls to the resource interfaces and API calls to other functions (calls to activation/provisioning service resources, for example). Moreover, new recipes may be constructed and existing recipes may be modified by the users of the cloud service manager 60/designers. It is noted that the recipes may be constructed using, for example, an API of the cloud service manager 60 to design a script; or the construction of the recipes may be GUI-based.

In this regard, in accordance with some implementations, a designer may edit the service blueprint 70 with GUI objects representing each resource or service involved. The GUI links may represent the workflow (customizable conditions and actions, for example). By clicking on the object, the designer may then be able to customize each service blueprint of the resource or service (e.g. setting variables or linking variables to other contexts, etc.)

For example, in accordance with some implementations, the designer may use the logic of the engine 40 of the service consumption module 66 to add, delete or other modify recipes for a given service blueprint 70; or create a new service blueprint 70. In accordance with some implementations, the GUI guides the designer through this process. It is noted, that in accordance with some implementations, different GUIs may be provided for the different users and designers. In this regard, the storefront module 62 may contain various GUIs for designers and possibly for users to modify, delete and create service blueprints 70. Moreover, separate screens may be presented in the portal to manage order capabilities.

In accordance with some implementations, an instantiated service blueprint 70 may be captured in an instantiated service repository 46. In this regard, data captured in the repository 46 may be viewed via a user interface for purposes of displaying reports and statuses of services to the users. The service repository 46, in addition to being populated via the designer tools, may ingest/aggregate/federate from different service repositories. It is noted that the users may also use GUI-based tools for purposes of viewing order statuses and managing order capabilities, in accordance with further implementations. A corresponding console page may also be used to call other service blueprint-related functions to manage the service instances. It is noted that information and alerts about the service blueprints resulting from monitoring the instances ensures that service blueprints recipes include deployment of appropriate agent/tool/setup to ensure management, and management tools associated to the resources are configured to monitor the instances.

Figure 7:
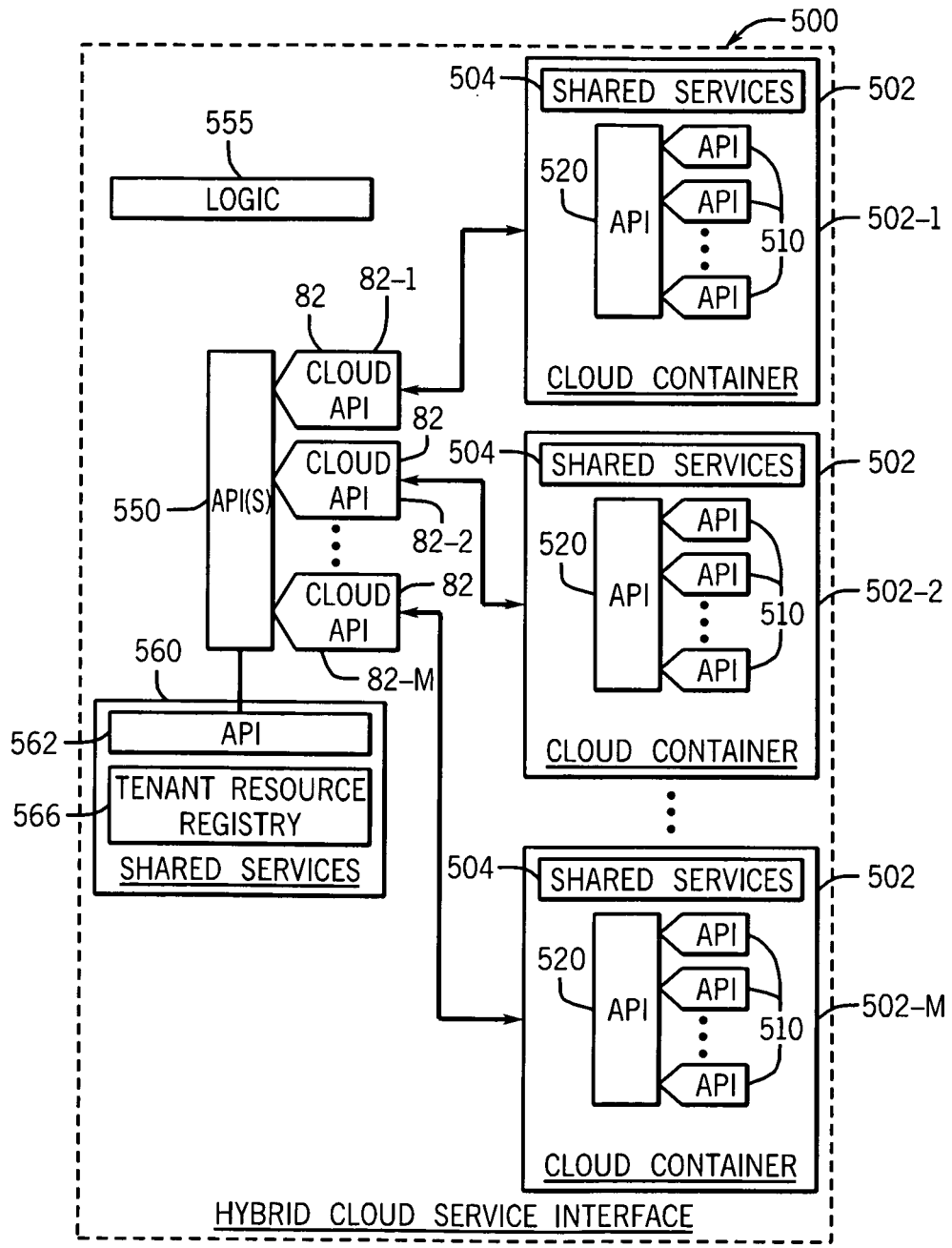
FIG. 7 is a schematic diagram of a hybrid cloud service interface according to another example implementation.

In accordance with a further implementation, a hybrid cloud service interface 500 may orchestrate the APIs 82 as part of an API model-based architecture that is illustrated in FIG. 7. This API model-based architecture may or may not contain components of the service blueprint architecture of FIG. 1, depending on the particular implementation.

The hybrid cloud service interface 500 contains overarching APIs 550, which are a superset of the APIs 82 (M APIs 82-1, 82-2 . . . 82-M, being depicted in FIG. 7 as examples), which are associated with a hybrid arrangement of clouds and different technologies. For this implementation, each API 82 forms an interface between one or multiple APIs 510 of a given cloud and the overarching APIs 550. As also depicted in FIG. 7, in accordance with some implementations, logic 555 may provide additional behavior described above for purposes of performing various cloud services actions, such as the actions depicted in FIGS. 3 and 4, for example (selection of pool/cloud, policy enforcement and so forth). The hybrid cloud service interface 500 may provide services for multiple tenants, and as such, may include a shared services module 560 containing an API 562 to control multiple tenant access, as well as a tenant resource registry 566.

As depicted in FIG. 7, in accordance with example implementations, each of the cloud APIs 82 correspond to a cloud service, such as a compute, storage, network, or image management service, as examples. As such, each cloud API 82 may communicate with a corresponding cloud container 500 (M cloud containers 500-1, 500-2 . . . 500-M, being depicted in FIG. 7 as examples), which, in turn, form the specific interfaces for the clouds that form the hybrid cloud. In this regard, the cloud compute container 500 contains APIs 510 for the various services provided as part of an associated cloud. For example, the APIs 510 for a given container 500 may contain APIs 510 for virtual machines, storage volumes, object stores, networks, and so forth of the associated cloud. A given cloud container 500 may also contain a shared services registry 504 as well as an API 520 for purposes of interfacing the APIs 510 to the corresponding associated cloud API 82. In accordance with example implementations, message brokering is employed for purposes of feeding requests through the APIs 550 to the appropriate API 82.

In accordance with some implementations, the cloud containers 500 are associated with coarse grain cloud services. The services may vary among the cloud containers 500, with some of the cloud services being shared in common. In accordance with some implementations, the overarching APIs 550 correspond to cloud services that are shared among the cloud containers 500. Therefore, for example, if a cloud does not provide a storage service, storage requests are directed to the other cloud(s) that offer the storage service. Conversely, if a cloud offers additional features or capabilities that are not offered by the other clouds, the additional feature(s) or service(s) may be potentially be lost.

Therefore, in accordance with further implementations, the overarching APIs 550 may be extended to expose "new" cloud services that are provided by newly-added clouds. If a request is made to use one of the new cloud services, the corresponding capabilities to perform the service are provisioned/reserved in the cloud(s) that offer these services. In accordance with some implementations, the API model architecture depicted in FIG. 7 may be replicated so that the cloud containers 500 of this additional model correspond to the clouds that offer the new services. As another variation, in accordance with an example implementation, APIs 82 that correspond to new features are orchestrated using the above-described service blueprints 70. As yet another variation, in accordance with an example implementation, the above-described service blueprint-based and API model-based architectures may be combined in a hybrid architecture in which some new feature APIs 82 are realized using service blueprints 70 and other new feature APIs 82 are realized using the API model-based architecture. Moreover, in accordance with further implementations, the introduction of a new cloud service in the service-blueprint architecture may be realized not re-authoring the service blueprints 70, but instead by binding "hybrid" service blueprints 70 to providers that are implementing (via adapters or plug-ins) the connection to the new cloud APIs. The same overarching APIs 550 may then be used across the different clouds. Additional new capability overarching APIs 550 may be exposed by building the specific blueprints for these functions. The service blueprints are discoverable in terms of the APIs that trigger their actions.

Figure 8:
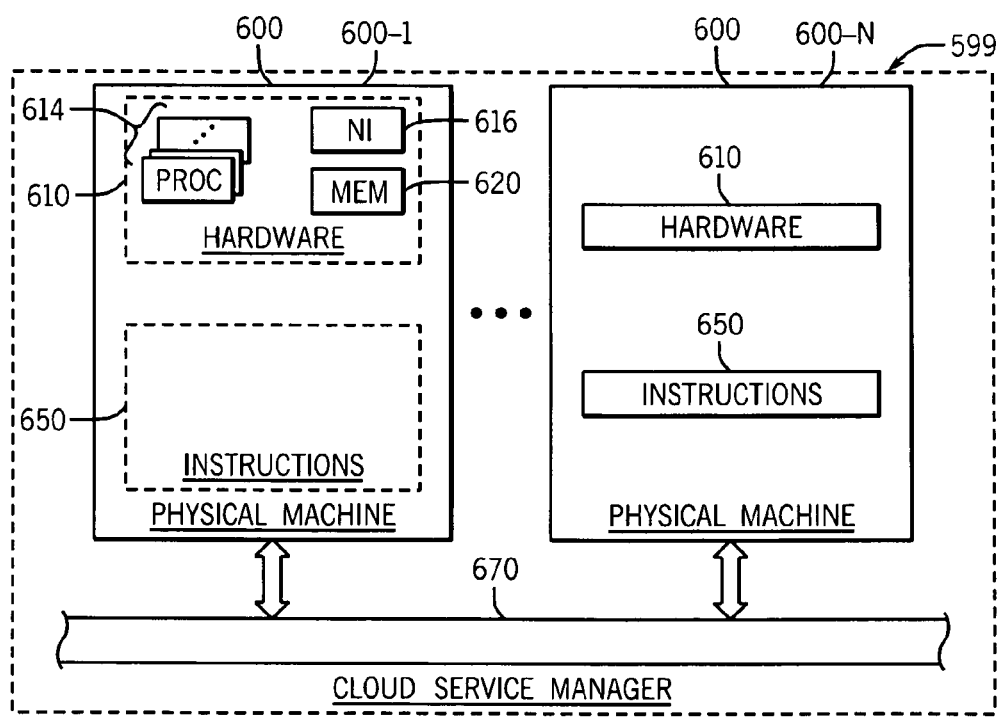
FIG. 8 is a schematic of a machine architecture according to an example implementation.

Any of the service blueprint or API model architectures that are disclosed herein may be implemented on a system 599 that is depicted in FIG. 8. Referring to FIG. 8, the system 599 includes one or multiple physical machines 600 (N physical machines 600-1 . . . 600-N, being depicted as examples in FIG. 8). The physical machine 600 is a machine that is made of actual hardware 610 and actual machine executable instructions 650. Although the physical machines 600 are depicted in FIG. 8 as being contained within corresponding boxes, a particular physical machine 600 may be a distributed machine, which has multiple nodes that provide a distributed and parallel processing system.

In accordance with exemplary implementations, the physical machine 500 may be located within one cabinet (or rack); or alternatively, the physical machine 500 may be located in multiple cabinets (or racks).

A given physical machine 600 may include such hardware 610 as one or more processors 614 and a memory 620 that stores machine executable instructions 650, application data, configuration data and so forth. In general, the processor(s) 614 may be a processing core, a central processing unit (CPU), and so forth. Moreover, in general, the memory 620 is a non-transitory memory, which may include semiconductor storage devices, magnetic storage devices, optical storage devices, and so forth.

The physical machine 600 may include various other hardware components, such as a network interface 616 and one or more of the following: mass storage drives; a display, input devices, such as a mouse and a keyboard; removable media devices; and so forth.

The machine executable instructions 650 contained in the physical machine 600 may, when executed by the processor(s) 614, cause the processor(s) 614 to form one or more components of any of the above-described service blueprint, API model or hybrid service blueprint-API model architectures that are disclosed herein. In general, the physical machines 600 communicate with each other over a communication link 670. This communication link 670, in turn, may be coupled to the user end devices 50 (see FIG. 1) and as such, may form at least part of the network fabric 29 (see FIG. 1). As non-limiting examples, the communication link 670 represents one or multiple types of network fabric (i.e., wide area network (WAN) connections, local area network (LAN) connections, wireless connections, Internet connections, and so forth). Thus, the communication link 670 may represent one or more multiple buses or fast interconnects.

As an example, the cloud service provider may be an application server farm, a cloud server farm, a storage server farm (or storage area network), a web server farm, a switch, a router farm, and so forth. Although two physical machines 600 (physical machines 600-1 and 600-N) are depicted in FIG. 8 for purposes of a non-limiting example, it is understood that the system 599 may contain a single physical machine 600 or may contain more than two physical machines 600, depending on the particular implementation (i.e., "N" may be "1," "2," or a number greater than "2").

While a limited number of examples have been disclosed herein, those skilled in the art, having the benefit of this disclosure, will appreciate numerous modifications and variations therefrom. It is intended that the appended claims cover.

What is claimed is:

1. A method comprising:
providing a hybrid cloud service interface to manage a plurality of cloud services provided by a plurality of cloud resources that form a hybrid cloud, the hybrid cloud service interface containing an overarching application programming interface that is a superset of coarse grain cloud application programming interfaces of the hybrid cloud service interface, each of the cloud application programming interfaces corresponding to a cloud resource of the plurality of cloud resources, and each of the cloud application programming interfaces forming an interface to at least one application programming interface of a corresponding cloud resource; and
orchestrating, by the hybrid cloud service interface, the cloud services by execution of the cloud application programming interfaces in the superset contained by the overarching application programming interface to perform at least one cloud resource management function provided by the hybrid cloud service interface across at least two of the plurality of cloud resources that form the hybrid cloud,
wherein the overarching application programming interface provides a cloud application programming interface for at least one function shared in common among the plurality of cloud resources.

2. The method of claim 1, wherein orchestrating the hybrid cloud service interface comprises using a service shared in common by the cloud application programming interfaces.

3. The method of claim 1, further comprising automatically selecting, by the hybrid cloud service interface, one of the cloud resources based on at least one of user provided criteria and criteria other than the user provided criteria.

4. The method of claim 1, further comprising checking, by the hybrid cloud service interface, a user request for a cloud service action against a policy.

5. The method of claim 1, further comprising providing, by the hybrid cloud service interface, at least one additional overarching application programming interface in response to an additional cloud service.

6. The method of claim 1, wherein the providing the hybrid cloud service interface comprises providing a service blueprint triggered by at least one of the cloud application programming interfaces to orchestrate the cloud application programming interfaces.

7. The method of claim 1, comprising:
providing, by the cloud application programming interfaces, metadata; and
using, by the hybrid cloud service interface, the metadata to determine cloud resources to be provisioned in response to a request.

8. The method of claim 1, wherein the hybrid cloud service interface includes service blueprints, each service blueprint including at least one recipe for executing cloud application programming interfaces, and
the orchestrating includes executing a recipe of a service blueprint of the service blueprints.

9. The method of claim 1, wherein the orchestrating includes executing a recipe that includes multiple branches associated with multiple cloud resources of the plurality of cloud resources, and each branch of the multiple branches making calls by an associated cloud application programming interface in the superset contained by the overarching application programming interface.

10. The method of claim 1, further comprising introducing, by the hybrid cloud service interface, a new cloud service for orchestration by binding service blueprints to a new cloud application programming interface.

11. An article comprising a non-transitory computer readable storage medium to store instructions that when executed by a processor cause the processor to:
provide a hybrid cloud service interface to manage a plurality of cloud services provided by a plurality of cloud resources that form a hybrid cloud;
provide at least one overarching application programming interface within the hybrid cloud service interface, the overarching application programming interface being a superset of coarse grain cloud application programming interfaces of the hybrid cloud service interface, each of the cloud application programming interfaces corresponding to a cloud resource of the plurality of cloud resources, and each of the cloud application programming interfaces forming an interface to at least one application programming interface of a corresponding cloud resource;
orchestrate the cloud services by execution of the cloud application programming interfaces in the superset contained by the overarching application programming interface to perform at least one cloud resource management function provided by the hybrid cloud service interface to be performed across at least two of the plurality of cloud resources; and
provide a cloud application programming interface in the overarching application programming interface for at least one function shared in common among the plurality of cloud resources.

12. The article of claim 11, the storage medium storing instructions that when executed by the processor cause the processor to provide an orchestrating application programming interface to orchestrate the application programming interfaces associated with the cloud resources.

13. The article of claim 11, the storage medium storing instructions that when executed by the processor cause the processor to provide a service blueprint triggered by at least one of the cloud application programming interfaces to orchestrate the cloud application programming interfaces.

14. The article of claim 11, the storage medium storing instructions that when executed by the processor cause the processor to:
provide metadata as a result of a search; and
use the metadata to determine cloud resources to provision in response to a request for cloud resources.

15. A system comprising:
a plurality of cloud containers, each of the cloud containers being associated with a cloud resource of a plurality of cloud resources forming a hybrid cloud and being associated with cloud services available for an associated cloud resource; and
a processor to provide a hybrid cloud service interface that
contains an overarching application programming interface that is a superset of coarse grain cloud application programming interfaces of the hybrid cloud service interface, each of the cloud application programming interfaces to communicate with a corresponding cloud container of the plurality of cloud containers, and each of the cloud application programming interfaces forming an interface to at least one application programming interface of the corresponding cloud container, and
orchestrates the cloud services by execution of the cloud application programming interfaces in the superset to perform at least one cloud resource management function provided by the hybrid cloud service interface across at least two of the plurality of cloud resources that form the hybrid cloud;
wherein the overarching application programming interface is to orchestrate cloud services that are shared in common among the cloud containers.

16. The system of claim 15, wherein at least one of the cloud containers comprises additional application programming interfaces, each of the additional application programming interfaces being associated with one of the cloud services associated with the container.

17. The system of claim 16, wherein the cloud services comprise at least one of a compute service, a storage service, a network service and an image management service.

18. The system of claim 15, comprising:
metadata generated by the cloud application programming interfaces, responsive to a search, wherein the metadata is usable to determine cloud resources to be provisioned in response to a request for cloud resources.

19. The system of claim 15, wherein the hybrid cloud service interface includes service blueprints, each service blueprint including at least one recipe for executing cloud application programming interfaces, and
the execution of the cloud application programming interfaces to orchestrate the cloud services includes execution of a recipe of a service blueprint of the service blueprints.

20. The system of claim 15, wherein the execution of the cloud application programming interfaces by the hybrid cloud service interface includes execution, by the processor, of a recipe that includes multiple branches associated with multiple cloud resources of the plurality of cloud resources, and each branch of the multiple branches including making calls by an associated cloud application programming interface in the superset contained by the overarching application programming interface.

* * * * *